US012765529B2

(12) United States Patent
Beaumont-Jones

(10) Patent No.: US 12,765,529 B2
(45) Date of Patent: Oct. 20, 2026

(54) COMPACT ROD HOLDER

(71) Applicant: James Beaumont-Jones, Brisbane (AU)

(72) Inventor: James Beaumont-Jones, Brisbane (AU)

( * ) Notice: Subject to any disclaimer, the term of this patent is extended or adjusted under 35 U.S.C. 154(b) by 78 days.

(21) Appl. No.: 19/101,217

(22) PCT Filed: Aug. 23, 2023

(86) PCT No.: PCT/AU2023/050807
§ 371 (c)(1),
(2) Date: Feb. 4, 2025

(87) PCT Pub. No.: WO2024/044808
PCT Pub. Date: Mar. 7, 2024

(65) Prior Publication Data

US 2026/0150829 A1 Jun. 4, 2026

(30) Foreign Application Priority Data

Aug. 29, 2022 (AU) ................................ 2022902478

(51) Int. Cl.
*A01K 97/10* (2006.01)
*A45F 5/00* (2006.01)
*A45F 5/02* (2006.01)

(52) U.S. Cl.
CPC ................ *A01K 97/10* (2013.01); *A45F 5/02* (2013.01); *A45F 5/1566* (2025.01)

(58) Field of Classification Search
CPC ....... A01K 97/10; A45F 5/021; A45F 5/1566; Y10S 224/922

(Continued)

(56) References Cited

U.S. PATENT DOCUMENTS 2,068,054 A * 1/1937 Haislip .................. A01K 97/10
224/907
2,139,188 A * 12/1938 Haislip .................. A01K 97/10
224/907

(Continued)

FOREIGN PATENT DOCUMENTS

GB 2435808 A 9/2007
KR 1179684 B1 * 9/2012

OTHER PUBLICATIONS

International Preliminary Report on Patentability dated Jun. 26, 2024 from PCT Application No. PCT/AU2023/050807 (3 pages).

(Continued)

*Primary Examiner* — Scott T Mcnurlen
(74) *Attorney, Agent, or Firm* — INNOVATION CAPITAL LAW GROUP, LLP; Vic Lin

(57) ABSTRACT

A rod holder has a rod support cup and a waistband clip. The waistband clip includes an interconnecting component and a distal component, with the interconnecting component being pivotally connected between the rod support cup and the distal component. The holder can be used in two configurations: a compact one where the components are closed together and the clip is inside the cup, and an in-use one where the clip is pivoted away from the cup. In the in-use configuration, the components can be opened to hold onto a waistband and suspend the rod support cup from it. The holder can be carried in one's pocket in the compact configuration. When required for use, the holder can be quickly assembled and attached to the waistband, even with one hand whilst fighting a fish with the other. Flexing between the rod support cup and the cup provides movement tolerance when walking.

12 Claims, 2 Drawing Sheets

(58) Field of Classification Search
USPC ....... 224/922, 200, 666, 251, 269; D22/147; 43/21.2
See application file for complete search history.

(56) References Cited

U.S. PATENT DOCUMENTS

| | | | | |
|---|---|---|---|---|
| 3,782,613 | A * | 1/1974 | Davis | A01K 97/10 224/922 |
| D271,413 | S * | 11/1983 | Munroe | D3/221 |
| 5,024,018 | A * | 6/1991 | Ferrigno | A01K 97/10 224/672 |
| 6,185,856 | B1 * | 2/2001 | Yakabe | A01K 97/10 224/922 |
| 6,591,542 | B1 | 7/2003 | Jordan | |
| 12,239,118 | B2 * | 3/2025 | Garrido | A01K 97/10 |
| 12,667,183 | B2 * | 6/2026 | Dilley | A45F 5/021 |
| 2007/0125814 | A1 | 6/2007 | Roh | |
| 2009/0134191 | A1 * | 5/2009 | Phillips | A45F 5/02 362/183 |
| 2015/0296763 | A1 * | 10/2015 | Sanders | A01K 97/10 224/200 |

OTHER PUBLICATIONS

International Search Report & Written Opinion dated Oct. 12, 2023 from PCT Application No. PCT/AU2023/050807 (10 pages).
International-type search report dated Jan. 9, 2023 from Australian Application No. 2022902478 (14 pages).

* cited by examiner

COMPACT ROD HOLDER

FIELD OF THE INVENTION

This invention relates to a compact device for holding fishing rods.

BACKGROUND OF THE INVENTION

A fishing rod harness is a device designed to secure and support fishing rods while allowing the angler to have their hands free for other tasks.

It typically consists of straps or harness-like components that can be worn around the angler's body. These straps are equipped with holders or attachments where fishing rods can be placed, keeping them in place and allowing the angler to engage in other activities without having to hold the rods constantly.

This type of harness is especially useful when fishing from a standing position and can provide convenience and comfort during extended fishing sessions.

However, these harnesses can restrict the angler's movement and comfort, especially during extended fishing sessions, due to the added weight and constraints they impose. Harnesses can also be cumbersome to put on and take off, which can be frustrating when anglers want to quickly switch between different fishing techniques or locations.

Furthermore, storing these bulky harnesses when not in use can be a challenge. They might take up significant space in storage compartments, on a boat, or in a tackle box. This can be problematic, especially when anglers have limited storage options available.

Furthermore, fishing rod holder harnesses are not especially portable. As such, carrying a harness to and from fishing locations can be inconvenient, particularly if anglers must travel a distance or hike to reach their preferred fishing spot.

The present invention seeks to provide a rod holder which will overcome or substantially ameliorate at least some of the deficiencies of the prior art, or to at least provide an alternative.

It is to be understood that, if any prior art information is referred to herein, such reference does not constitute an admission that the information forms part of the common general knowledge in the art, in Australia or any other country.

SUMMARY OF THE DISCLOSURE

There is provided herein a compact rod holder comprising a rod support cup and a waistband clip.

The clip consists of an interconnecting component and a distal component, the interconnecting component being pivotally connected between the cup and the distal component.

As such, the holder can assume a compact configuration wherein the components are closed together, or an in-use configuration with the clip is pivoted away from the cup to engage a waistband and suspend the cup without requiring a harness.

The holder can be carried in one's pocket in the compact configuration. When required for use, the holder can be quickly assembled and attached to the waistband, even with one hand whilst fighting a fish with the other.

The rod support cup may be comfortably positioned over the thigh and flexing between the rod support cup and the cup provides movement tolerance when walking.

The clip components can be magnetically attracted to grip the waistband, with permanent magnets of opposite polarity. The cup may have a convex backing surface which ergonomically presses against the leg, and a concave interior surface which centrally retains a fishing rod butt.

Other aspects of the invention are also disclosed.

BRIEF DESCRIPTION OF THE DRAWINGS

Notwithstanding any other forms which may fall within the scope of the present invention, preferred embodiments of the disclosure will now be described, by way of example only, with reference to the accompanying drawings in which.

DESCRIPTION OF EMBODIMENTS

Figure 2:
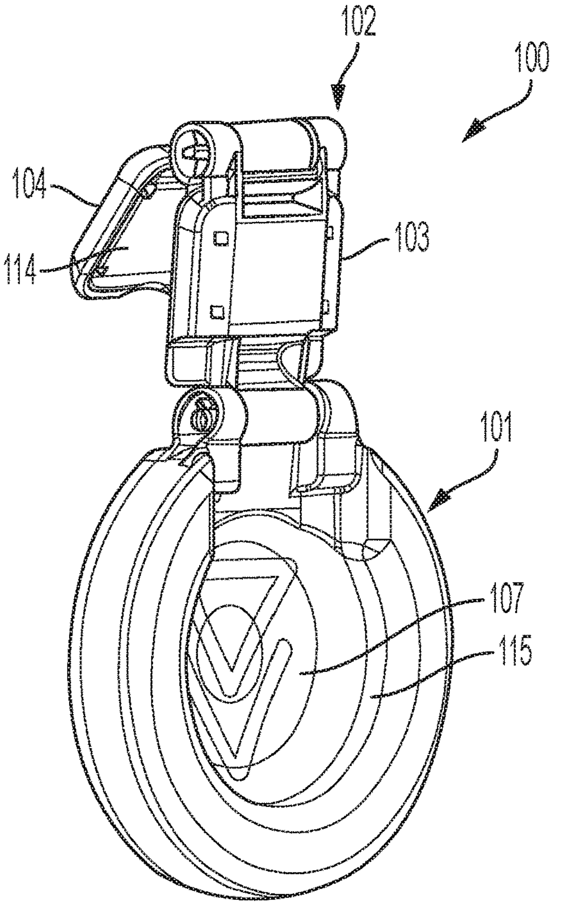
FIG. 2 shows a front perspective view of the rod holder in an in-use configuration.

FIG. 2 shows a rod holder 100 comprising a rod support cup 101 and a waistband clip 102.

The waistband clip 102 comprises an interconnecting component 103 and a distal component 104. The interconnecting component 103 is pivotally coupled between the rod support cup 101 and the distal component 104.

Figure 1:
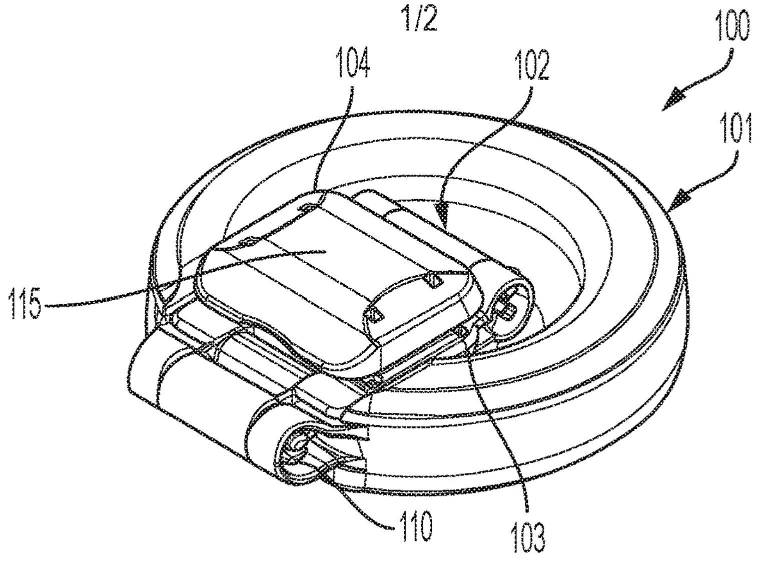
FIG. 1 shows a rod holder in a compact configuration.

As such, the holder 100 is configurable in the compact configuration shown in FIG. 1 wherein the components 103, 104 are closed together and the clip 102 is retained within the cup 101.

Furthermore, the holder 100 is configurable in an in-use configuration shown in FIG. 2 wherein the waistband clip 102 is pivoted away from the cup 101 and wherein the components 103, 104 can be open to engage a waistband therebetween to suspend the rod support cup 101 therefrom.

In the compact configuration, the rod holder 100 is small enough to be carried in a pocket. Furthermore, as opposed to using a traditional harness, the rod holder 100 can be opened in the manner shown in FIG. 1 and the clip 102 opened to clip over a waistband to suspend the rod support cup 100 therefrom. The rod support cup 100 may be ergonomically positioned over one's thigh to more comfortably withstand the force applied by the rod support cup 101 when a butt of a fishing rod is held in the cup 100. The pivot between the interconnecting component 103 and the rod support cup 101 allows the rod support cup 101 to flex with walking movement.

Figure 5:
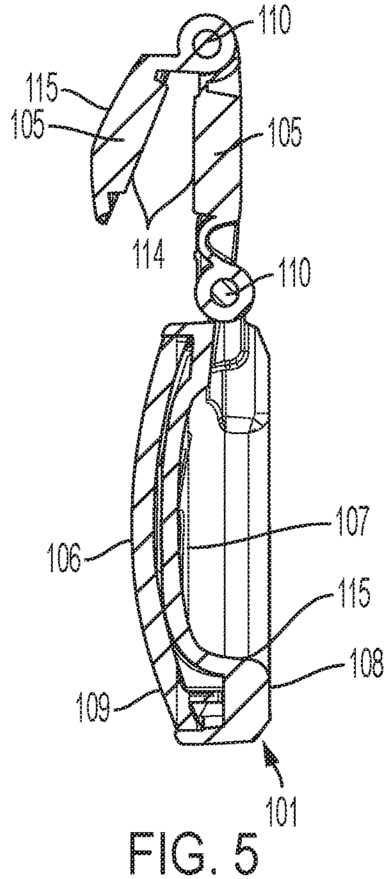
FIG. 5 shows a side cross-sectional view of the rod holder.

In a preferred embodiment, the components 103, 104 magnetically attract each other to grip the waistband therebetween. With reference FIG. 5, each component 103, 104 may define a respective interior 105 within which respective magnetic pieces are retained. In embodiments, both interiors 105 have permanent magnets which attract with opposite polarity.

Figure 3:
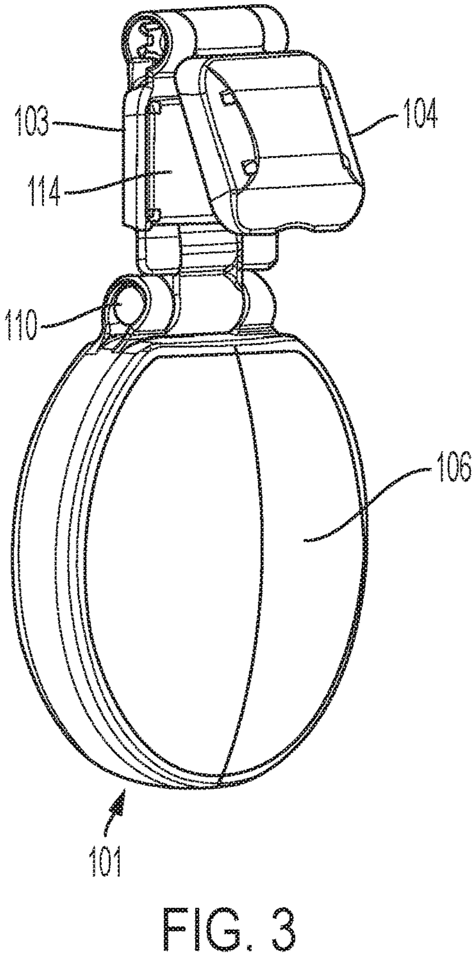
FIG. 3 shows a rear view of the rod holder.

With reference to FIG. 3, the rod support cup 101 preferably comprises a convex backing surface 106 to ergonomically press against one's leg. Similarly, with reference to FIG. 2, the rod support cup 101 may define a concave interior surface 107 to centrally retain the fishing rod butt irrespective of the diameter thereof.

The concave interior surface 107 may be bounded by a side wall 115 to prevent the fishing rod butt slipping off the concave interior surface 107.

Furthermore, the interior surface 107 may have protrusions thereon (shown generally as triangular shaped protrusions) which assist in the frictional gripping of the butt of the fishing rod.

Figure 4:
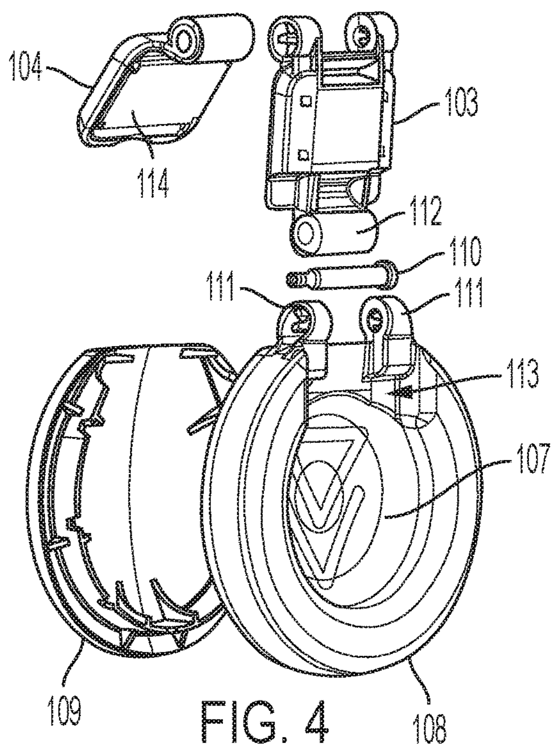
FIG. 4 shows a front perspective disassembled view of the rod holder.

As is shown in FIG. 4, the rod support cup 101 may be formed by an outer piece 108 which clips to an inner piece 109. The outer piece 108 may define the interior concave surface 107 whereas the inner piece 109 may define the convex backing surface 106.

Split-headed hinge pins 110 may interface the rod support cup 101 and the interconnecting component 103 and the interconnecting component 103 and the distal component 104. The head of the hinge pin 110 may be squeezed together to remove the hinge pin 110 for disassembly.

With reference to FIG. 4, the rod support cup 101 may define a pair of side pivot mounting points 111 pivotally retaining a central pivot barrel 112 of the interconnecting component 103 therebetween.

The cup 107 may define a side channel 113 aligned with the mounting points 111 which is wider than a width of the interconnecting component 104 so that the interconnecting component 104 can fit into the channel 113 when the rod holder 100 is in the compact configuration as is shown in FIG. 1.

The components 103, 104 may define flat interfacing faces. The distal component 104 may have a convex exterior surface 115 for ergonomic conformity when the rod holder 100 is in the compact configuration.

The foregoing description, for purposes of explanation, used specific nomenclature to provide a thorough understanding of the invention. However, it will be apparent to one skilled in the art that specific details are not required in order to practise the invention. Thus, the foregoing descriptions of specific embodiments of the invention are presented for purposes of illustration and description. They are not intended to be exhaustive or to limit the invention to the precise forms disclosed as obviously many modifications and variations are possible in view of the above teachings. The embodiments were chosen and described in order to best explain the principles of the invention and its practical applications, thereby enabling others skilled in the art to best utilize the invention and various embodiments with various modifications as are suited to the particular use contemplated. It is intended that the following claims and their equivalents define the scope of the invention.

The invention claimed is:

1. A rod holder comprising a rod support cup and a waistband clip, the waistband clip comprising an interconnecting component and a distal component, the interconnecting component being pivotally coupled between the rod support cup and the distal component so that the holder is configurable in:

a compact configuration wherein the components are closed together and the clip is retained within the cup; and an in-use configuration wherein the clip is pivoted away from the cup and wherein the components can be opened to engage a waistband therebetween to suspend the rod support cup therefrom.

2. The rod holder as claimed in claim 1, wherein the components magnetically attract each other.

3. The rod holder as claimed in claim 2, wherein each component defines an interior within which a respective magnetic piece is retained.

4. The rod holder as claimed in claim 1, wherein the rod support cup comprises a convex backing surface.

5. The rod holder as claimed in claim 4, wherein the rod support cup comprises a concave interior surface.

6. The rod holder as claimed in claim 5, wherein the concave interior surface is bounded by a side wall.

7. The rod holder as claimed in claim 1, wherein the rod support cup comprises interconnecting outer and inner pieces, the outer piece defining a concave interior and the inner piece defining a convex backing.

8. The rod holder as claimed in claim 1, wherein the cup defines a pair of side pivot mounting points pivotally retaining a central pivot barrel of the interconnecting component therebetween, and a side channel aligned with the mounting points wider than a width of the interconnecting component.

9. The rod holder as claimed in claim 1, wherein the components define flat interfacing faces.

10. The rod holder as claimed in claim 1, wherein the distal component has a convex exterior surface.

11. The rod holder as claimed in claim 1, wherein split-headed hinge pins interface the rod support cup and the interconnecting component, and the interconnecting component and the distal component.

12. A method of holding a rod using the rod holder as claimed in claim 1, the method comprising clipping the waistband clip to a waistband to suspend the rod support cup therefrom and inserting a fishing rod butt into the rod support cup.

* * * * *